(12) United States Patent  
Koide

(10) Patent No.: US 8,270,006 B2  
(45) Date of Patent: Sep. 18, 2012

(54) COMMUNICATION APPARATUS AND FACSIMILE COMMUNICATION SYSTEM

(75) Inventor: Atsuko Koide, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 1478 days.

(21) Appl. No.: 11/797,315

(22) Filed: May 2, 2007

(65) Prior Publication Data

US 2008/0002222 A1    Jan. 3, 2008

(30) Foreign Application Priority Data

Jul. 3, 2006  (JP) .................................. 2006-183373

(51) Int. Cl.
 *G06F 3/12* (2006.01)
(52) U.S. Cl. ..................... 358/1.15; 358/426.1; 358/442; 379/100.05; 379/100.13; 379/100.17
(58) Field of Classification Search .......... 358/1.1–3.23, 358/400–476
See application file for complete search history.

(56) References Cited

U.S. PATENT DOCUMENTS

| 2002/0054368 A1* | 5/2002 | Chimura et al. .............. 358/407 |
| 2005/0007636 A1* | 1/2005 | Leung .......................... 358/434 |

FOREIGN PATENT DOCUMENTS

| JP | 05-030323 A | 2/1993 |
| JP | 11-041443 A | 2/1999 |

* cited by examiner

*Primary Examiner* — Benny Q Tieu  
*Assistant Examiner* — Marcellus Augustin  
(74) *Attorney, Agent, or Firm* — Rabin & Berdo, P.C.

(57) ABSTRACT

When a facsimile transmission is carried over a packet network such as the Internet that disallows the use of non-standard facilities with which the facsimile terminals may be provided, a communication apparatus that mediates the transmission blocks signals requesting the use of non-standard facilities, but replaces the blocked signals with modified data not requesting the use of such facilities. Consequently, even if a facsimile terminal sends a lengthy non-standard facilities signal, the facsimile terminal with which it is communicating will not time out due to non-reception of data, and the facsimile transmission can be completed using standard facilities.

16 Claims, 8 Drawing Sheets

COMMUNICATION APPARATUS AND FACSIMILE COMMUNICATION SYSTEM

BACKGROUND OF THE INVENTION

1. Field of the Invention

The present invention relates to a facsimile communication system, more particularly to a communication apparatus that suppresses proprietary protocols in order to assure successful facsimile communication.

2. Description of the Related Art

Voice communication apparatus that relays voice packets on a network such as the Internet commonly accommodates facsimile terminals as well as telephone terminals. Facsimile data have traditionally been sent over voice channels in telephone networks by procedures specified in Recommendation T.30 ('Procedures for Document Facsimile Transmission in the General Switched Telephone Network') of the Telecommunications Sector of the International Telephone and Telegraph Union (ITU-T). For transmission over the networks such as the Internet, however, the Internet Facsimile Protocol (IFP) described in ITU-T Recommendation T.38 ('Procedures for Real-Time Group-3 Facsimile Communication over IP Networks') is frequently used. The T.38 facsimile data transmission protocol is based on the T.30 protocol, but T.38 call connection procedures are based on a protocol such as the one given in ITU-T Recommendation H.323 ('Packet Based Multimedia Communication Systems'). Details can be found in Japanese Patent Application Publications No. 2006-5482, 2004-32007, and 2003-244383.

ITU-T Recommendation T.38 is usually used on networks of limited bandwidth that carry voice data in a compressed form, as specified in Annex A of ITU-T Recommendation G729 ('Coding of Speech at 8 kb/s Using Conjugate-Structure Algebraic-Code-Excited Linear Prediction'), for example. The voice transmission equipment in these networks compresses voice data at the transmitting end and decompresses the data at the receiving end, but the compression and decompression process is lossy; the decompressed data generally differ somewhat from the original data.

For voice data, minor data alterations can easily be tolerated, but in a facsimile transmission, such alterations tend to cause noticeable defects in the received facsimile document. For this reason, voice transmission equipment that compresses voice data conventionally transmits the facsimile data as signaling data instead of voice data, converting the facsimile data to IFP packets and transmitting the IFP packets through a control signal communication channel.

When facsimile signals received from a facsimile terminal are converted to IFP packets for transmission according to ITU-T Recommendation T.38, the facsimile data are analyzed and restrictions such as the following are imposed.

(1) Facsimile communication according to ITU-T Recommendation V.34 ('A Modem Operating at Data Signaling Rates of up to 33600 bps for Use on the General Switched Telephone Network and on Lease Point-to-Point, Two-Wire, Telephone-Type Circuits') is blocked, because ITU-T Recommendation T.38 only supports facsimile transmission up to ITU-T Recommendation V.17 ('A 2-Wire Modem for Facsimile Applications with Rates up to 14400 bits/s').

(2) If the manufacturer of the facsimile terminal equipment has used the non-standard facilities (NSF) signal provided in ITU-T Recommendation T.30 to implement proprietary communication functions (communication functions other than those specified in ITU-T Recommendation T.30), the NSF signal will be blocked by voice communication equipment that carries out facsimile transmission according to ITU-T Recommendation T.38, because the voice communication equipment cannot handle the manufacturer's proprietary communication system. That is, any facsimile data that are determined to represent an NSF signal will be discarded instead of being transmitted to the destination facsimile terminal.

Facsimile transmission through conventional voice communication equipment complying with ITU-T Recommendation T.38 will be further described with reference to FIGS. 1 to 3.

FIG. 1 illustrates facsimile transmission from a facsimile terminal 1A to a facsimile terminal 1B. Facsimile terminal 1A is accommodated by communication apparatus 100A, which transmits to communication apparatus 100B, which accommodates facsimile terminal 1B. Facsimile terminal 1B has proprietary functions that cause it to send NSF signals. Communication apparatus 100A comprises a digital signal processing unit 110A, a jitter absorption buffer 120A, a voice processing unit 130A, a facsimile communication processing unit 140A, and a call processing unit 150a. Communication apparatus 100B comprises similar components with similar reference characters, the final A being changed to B.

FIG. 2 illustrates a typical communication signaling sequence. To initiate facsimile communication, facsimile terminal 1A originates a call to the receiving facsimile terminal and sends a calling tone (CNG) as specified in ITU-T Recommendation T.30 (S510-1).

The digital signal processing unit 110A in communication apparatus 100A detects the calling tone sent from facsimile terminal 1A and notifies the facsimile communication processing unit 140A (S510-2), which converts the calling tone to an IFP packet. This CNG packet is sent on a control signal channel P2 on the network (NW) and received by the facsimile communication processing unit 140B of communication apparatus 100B (S510-3). Facsimile communication processing unit 140B notifies the digital signal processing unit 110B in communication apparatus 100B (S510-4), which sends a calling tone to facsimile terminal 1B (S510-5).

When facsimile terminal 1B receives the calling tone, it sends a called station identification tone (CED) toward facsimile terminal 1A (S520-1) as specified in ITU-T Recommendation T.30.

The CED tone is detected by the digital signal processing unit 110B in communication apparatus 100B, the facsimile communication processing unit 140B is notified (S520-2), and the tone is converted to an IFP packet which is sent over the control signaling channel P2 on the network to communication apparatus 100A (S520-3). There the IFP packet is received by the facsimile communication processing unit 140A, the digital signal processing unit 110A is notified (S520-4), and digital signal processing unit 110A sends a CED tone to facsimile terminal 1A (S520-5).

Next, the receiving facsimile terminal 1B sends a preamble signal to the transmitting facsimile terminal 1A as specified in ITU-T Recommendation V.21 ('300 Bits per Second Duplex Modem Standardized for Use in the General Switched Telephone Network'). The preamble signal is transmitted (S530-1 to S530-5) in the same way as the CED tone signal (S520-1 to S520-5), being converted to IFP packet form for transmission between the communication apparatuses 100A and The receiving facsimile terminal 1B continues by sending an NSF signal toward the transmitting facsimile terminal 1A (S540-1, S540-2). The digital signal processing unit 110B in communication apparatus 100B receives and analyzes the NSF signal, finds that it relates to a proprietary function introduced by the manufacturer of facsimile terminal 1B, and discards the NSF signal (S550) without passing it on. The communication apparatuses detect facsimile signals at fixed intervals of, for example, one hundred milliseconds (100 ms), so a single NSF signal may sometimes be received as two separate signals, as illustrated.

When the receiving facsimile terminal 1B has finished sending its NSF signal, it sends a Called Subscriber Identification (CSI) signal and a Digital Information Signal (DIS) to the transmitting facsimile terminal 1A as specified in ITU-T Recommendation T.30 (S560-1 to S560-5 and S570-1 to S570-5). The sequence continues with further signals, which will not be described.

As illustrated by this sequence, when the receiving facsimile terminal 1B sends an NSF signal, the NSF signal is blocked at the communication apparatus 100B to which the receiving facsimile terminal 1B is connected, while the signals following the NSF signal are transmitted onward as if the NSF signal had not be sent at all. This enables the communication apparatus 100B to carry out facsimile transmission according to ITU-T Recommendation T.38.

The transmitting facsimile terminal 1A measures the elapsed time from reception of the preamble signal from facsimile terminal 1B to reception of the following CSI or DIS signal. The value Ta of this elapsed time is:

$$Ta = \text{preamble signal transmission time} + NSF \text{ signal transmission time} \quad (1)$$

If the transmitted facsimile data are buffered for a certain time in order to absorb network jitter, the value of Ta is increased accordingly:

$$Ta = \text{preamble signal transmission time} + \quad (2)$$
$$NSF \text{ signal transmission time} +$$
$$\text{buffering time to absorb network jitter}$$

A problem with the practice of blocking NSF signals at the communication apparatus is that the functions implemented by facsimile manufacturers by use of the NSF signal have become increasingly complex. This is especially true when the facsimile terminal is a multi-function device that may also operate as a printer, scanner, and copier. The lengths of NSF signals have consequently increased to the point where, in the sequence in FIG. 2, the transmitting facsimile terminal 1A may time out while communication apparatus 100B is blocking the NSF signal, before the CSI or DIS signal can be transmitted, in which case the facsimile terminal 1A disconnects the call and the facsimile transmission fails.

Such a failure is illustrated in FIG. 3. The CNG and CED tones and V.21 preamble are transmitted as in FIG. 2. When the transmitting facsimile terminal 1A receives the V.21 preamble (S530-5), it starts a timer that measures a predetermined time-out time Tb. The facsimile terminal 1B now begins a long period of NSF signal transmission (S540-1 to S540-n) which is blocked (S550) at communication apparatus 100B. After completing the NSF signal transmission, the receiving facsimile terminal 1B sends CSI and DIS signals (S560-1, S570-1), but the time Ta that elapses before the first of these signals reaches the transmitting facsimile terminal 1A (S560-5) exceeds the time-out time Tb. At the point when time Tb has elapsed, facsimile terminal 1A disconnects (S580), so it does not receive the CSI and DIS signals, or receives them but ignores them, and the facsimile transmission fails.

SUMMARY OF THE INVENTION

An object of the present invention is to provide communication apparatus and a facsimile communication system that can prevent a facsimile transmission carried over a network such as the Internet from being disconnected due to a time-out because the receiving facsimile terminal sent signals requesting the use of non-standard facilities not supported by the communication apparatus.

The invention provides a communication apparatus connectable to a facsimile terminal and a network. The communication apparatus has a facsimile communication processing unit for mediating facsimile transmission compliant with a predetermined protocol by converting first facsimile signals received from the facsimile terminal to first facsimile packets, sending the first facsimile packets on the network, converting second facsimile packets received from the network to second facsimile signals, and sending the second facsimile signals to the facsimile terminal.

A data recognition module in the communication apparatus analyzes the first and/or second facsimile signals and designates as non-transmittable any facsimile signals that identify and request use of a non-standard facility left unspecified by the predetermined protocol. A data abandonment module blocks the facsimile signals designated as non-transmittable by the data recognition module.

A replacement data memory stores replacement data nullifying use of the non-standard facility. A replacement signal transmission control module replaces the data identifying the non-standard facility with the replacement data, thereby converting a non-transmittable first or second facsimile signal to a modified facsimile signal. Modified first facsimile signals are passed to the facsimile communication processing unit to be converted to packets and sent on the network. Modified second facsimile signals are passed to the facsimile communication processing unit to be sent to the facsimile terminal.

The invention also provides a facsimile transmission system including the above communication apparatus, network, and facsimile terminal, at least one other communication apparatus with which the above communication apparatus communications over the network, and at least one other facsimile terminal connected to the other communication apparatus.

In the invented communication apparatus and facsimile communication system, by sending the modified first or second facsimile signal at an appropriate time, the replacement signal transmission control module can prevent a facsimile transmission from being terminated by a time-out while still blocking the use of non-standard facilities, thereby enabling the facsimile transmission to be completed by the use of standard facilities.

DETAILED DESCRIPTION OF THE INVENTION

Figure 1:
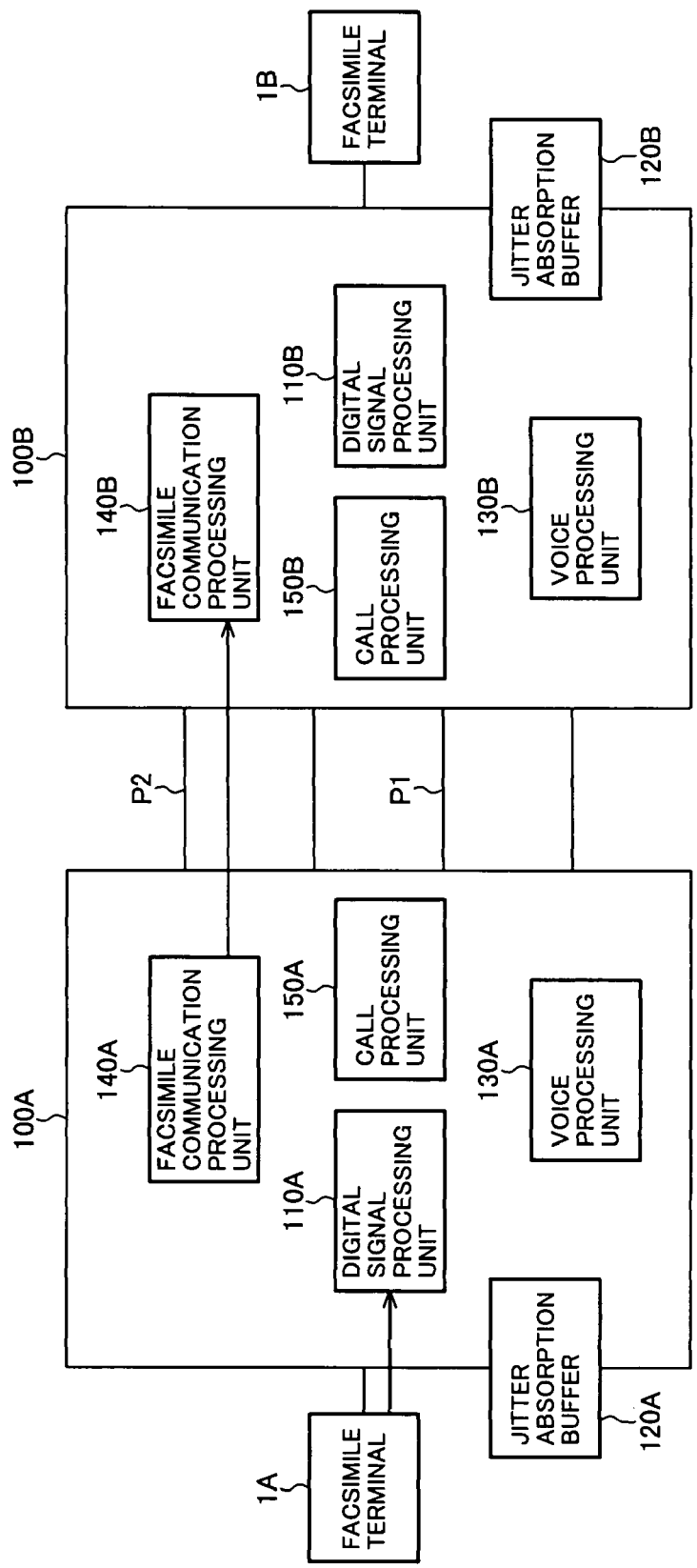
FIG. 1 is a block diagram illustrating a conventional facsimile communication system.
Figure 2:
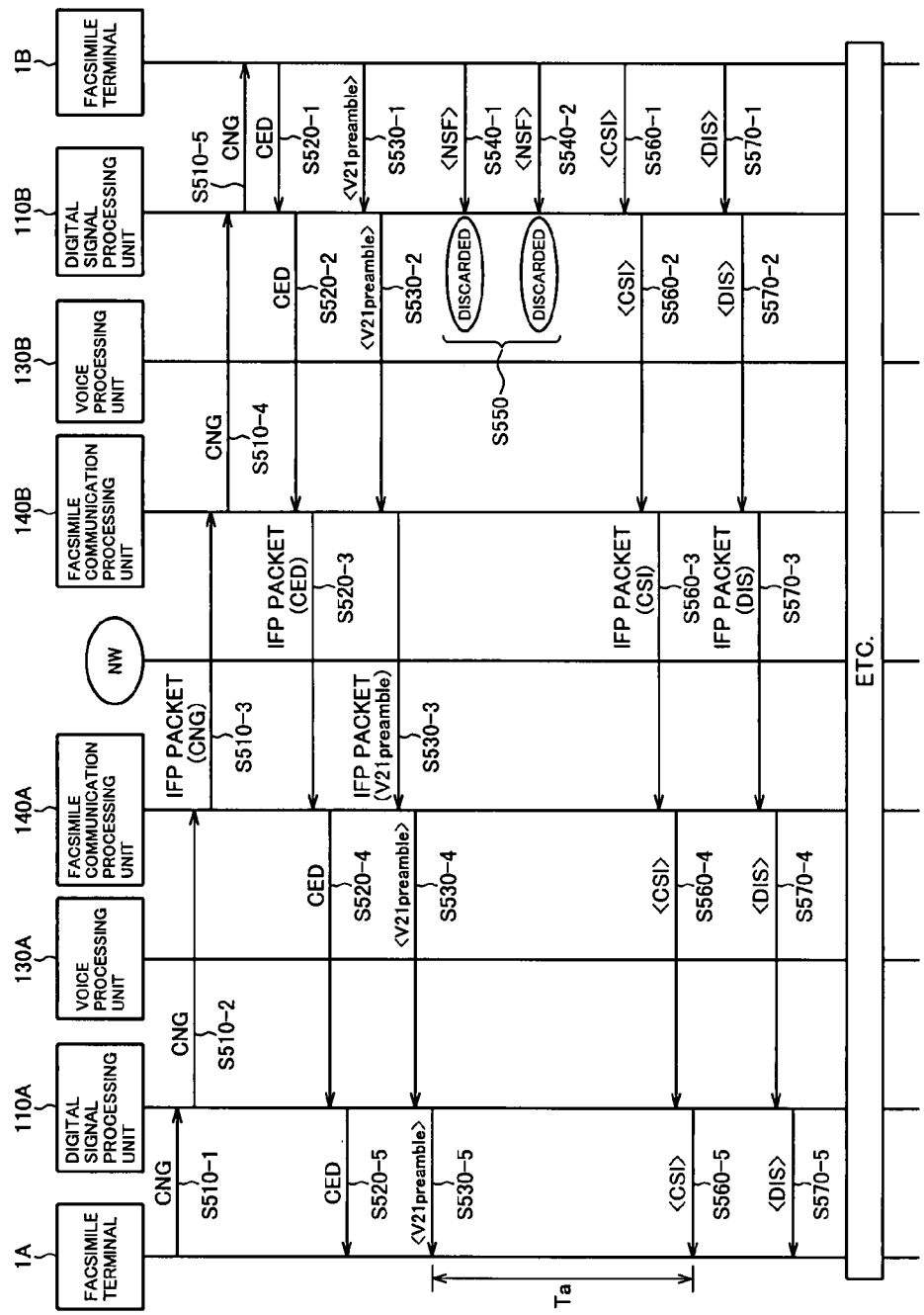
FIG. 2 illustrates an initial part of a successful conventional facsimile communication sequence.

Embodiments of the invention will now be described with reference to the attached drawings, in which like elements are indicated by like reference characters.

First Embodiment

Figure 4:
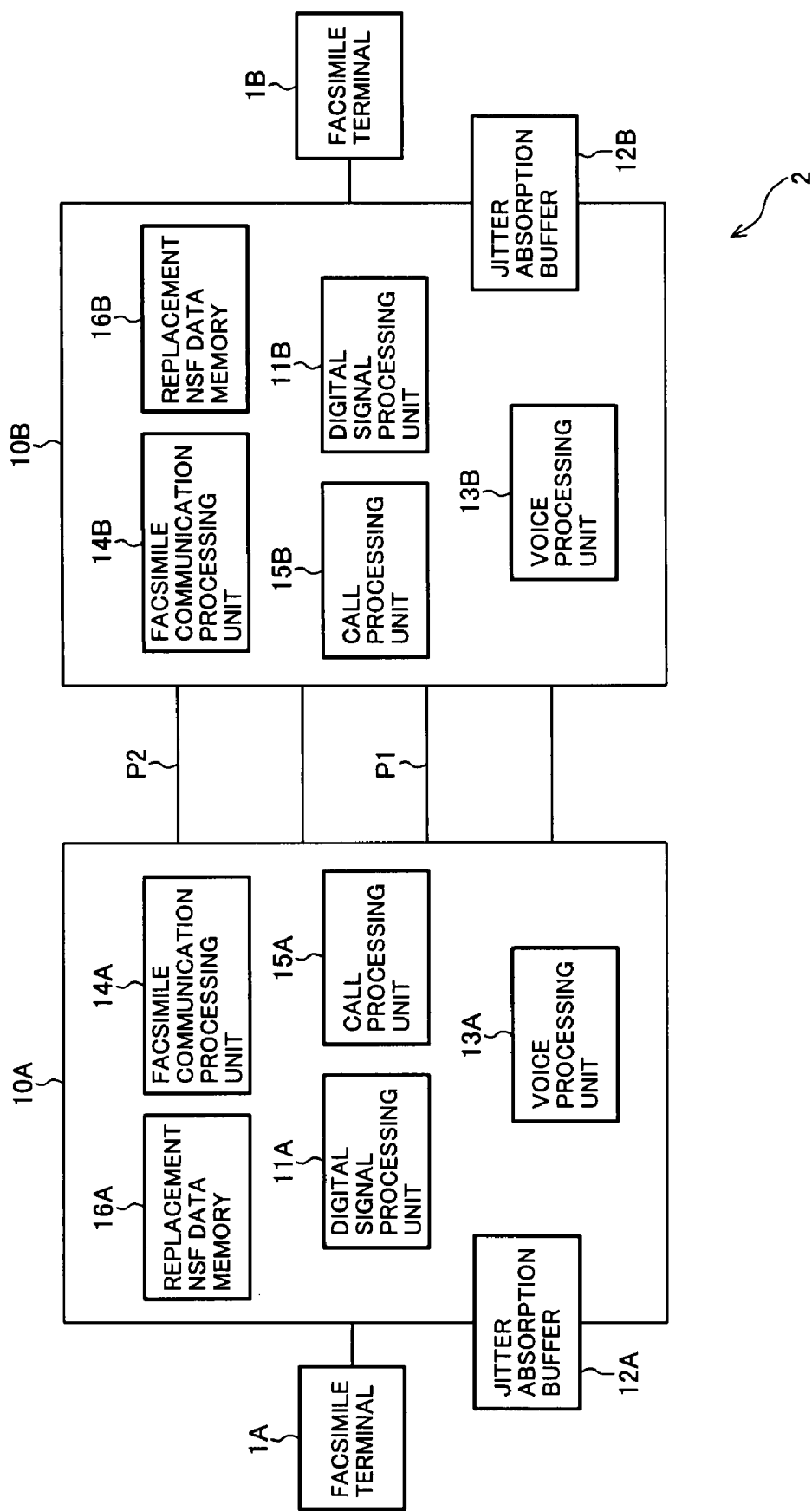
FIG. 4 is a block diagram illustrating a facsimile communication system according to a first embodiment of the invention.

Referring to FIG. 4, the facsimile transmission system 2 of the first embodiment includes facsimile terminals 1A and 1B, communication apparatus 10A connected to facsimile terminal 1A, and communication apparatus 10B connected to facsimile terminal 1B. Communication apparatus 10A and communication apparatus 10B are interconnected through a network such as the Internet that provides at least a voice signal path P1 and a control signal path P2 between them. These paths P1, P2 enable the network connection to mimic a telephone network connection. The call control procedure on the network complies with ITU-T Recommendation H.323.

Facsimile terminals 1A and 1B are, for example, conventional facsimile machines or conventional multi-function devices. The facsimile terminals 1A, 1B may be connected directly to the communication apparatuses 10A, 10B as shown, or may be connected to the communication apparatuses 10A, 10B through other equipment such as private branch exchange (PBX) equipment.

In the following description of the first embodiment, facsimile terminal 1A is the transmitting terminal and facsimile terminal 1B is the receiving terminal. During the signaling process carried out to initiate facsimile communication, facsimile terminal 1B sends an NSF signal inviting facsimile terminal 1A to use a proprietary communication sequence implemented by the manufacturer of facsimile terminal 1B, differing from the T.38 protocol.

The communication apparatuses 10A, 10B carry out facsimile communication according to ITU-T Recommendation T.38. Although only the facsimile terminals 1A, 1B are shown, the communication apparatuses 10A, 10B may also accommodate voice communication terminals and information processing terminals and carry out voice and data communication.

Internally, each communication apparatus 10A (10B) comprises a digital signal processing unit 11A (11B), a jitter absorption buffer 12A (12B), a voice processing unit 13A (13B), a facsimile communication processing unit 14A (14B), a call processing unit 15A (15B), and a replacement NSF data memory 16A (16B), as shown in FIG. 4.

The digital signal processing units 11A, 11B control the functions of the communication apparatuses 10A, 10B; each digital signal processing unit comprises, for example, a digital signal processor (DSP). The functions implemented by the digital signal processing units 11A, 11B include voice signal compression and decompression, facsimile signal tone detection, facsimile data analysis, time-out prevention, facsimile modem functions, and control of the jitter absorption buffers 12A, 12B.

Next, the details of the time-out prevention function of the digital signal processing units 11A, 11B in the first embodiment will be described with reference to FIGS. 5 and 6.

In the first embodiment, time-out prevention is performed in the communication apparatus accommodating the receiving terminal. In the following description, accordingly, time-out prevention is performed by the digital signal processing unit 11B of communication apparatus 10B in FIG. 4, but the digital signal processing unit 11A of communication apparatus 10A is also capable of performing this function when facsimile terminal 1A is the receiving terminal.

Figure 5:
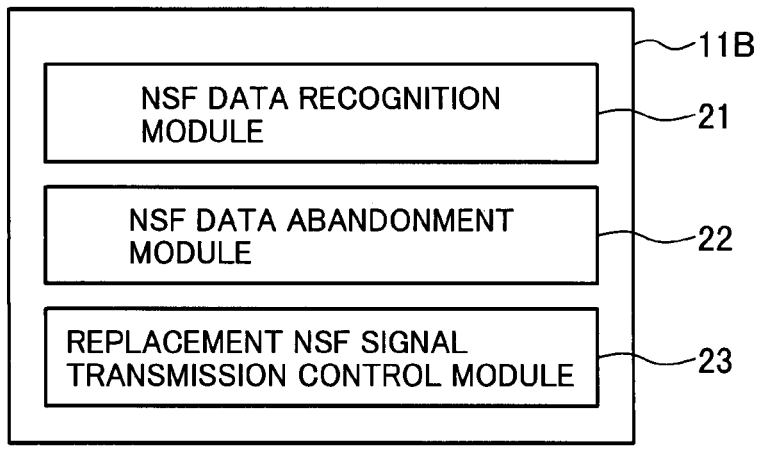
FIG. 5 is a block diagram illustrating relevant functional blocks of the digital signal processing units in FIG. 4.

FIG. 5 is a functional block diagram showing the functional blocks of digital signal processing unit 11B that implement time-out prevention. These functional blocks are an NSF data recognition module 21, an NSF data abandonment module 22, and a replacement NSF signal transmission control module 23.

The NSF data recognition module 21 receives facsimile data from the facsimile terminal 1B when facsimile terminal 1B operates as the receiving terminal, analyzes the received data, and detects NSF data that request use of a non-standard facility not complying with ITU-T Recommendation T.38.

Figure 6:
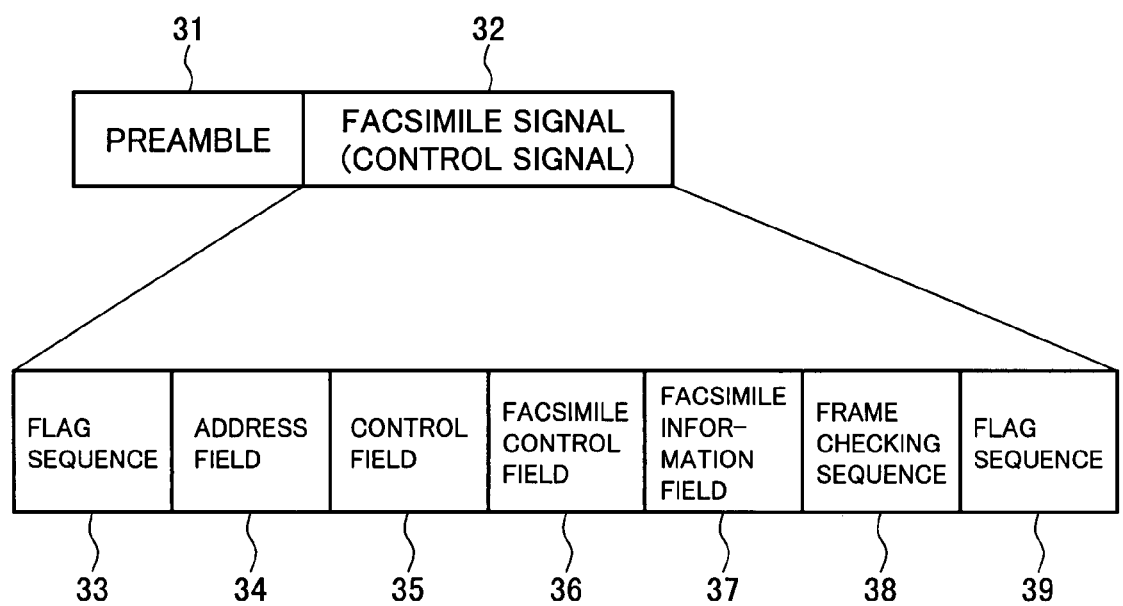
FIG. 6 illustrates the structure of a control signal frame in a binary signaling system.

FIG. 6 illustrates the structure of a control signal frame sent to communication apparatus 10B in the binary signaling system used by facsimile terminal 1B. The frame in FIG. 6 has two components: a preamble 31 and a facsimile signal 32 (a facsimile control signal). The facsimile signal comprises a flag sequence 33, an address field 34, a control field 35, a facsimile control field 36, a facsimile information field 37, a frame checking sequence 38, and a flag sequence 39.

The flag sequences 33, 39 indicate the start and end of the frame. Each flag sequence comprises eight bits with the bit values '01111110'.

The address field 34 indicates facsimile communication. For one-to-one facsimile transmission via general telephone networks, for example, the address field 34 comprises eight bits with the bit values '11111111'.

The control field 35 is an eight-bit command and reply field with the value '1100x000', used for data link control. When x is '1', the current frame is the final frame, and when x is '0', the current frame is not the final frame.

The facsimile control field 36 is an eight-bit field indicating the type of control signal that follows, such as NSF, DIS, or CSI. For an NSF signal, the value of the facsimile control field 36 is '00000100'.

The facsimile information field 37 contains additional information further describing the control signal indicated in the facsimile control field 36. When the control signal is an NSF signal, the facsimile information field 37 contains information identifying a proprietary communication protocol. In general, the information includes a vendor code identifying the manufacturer of the facsimile terminal that transmits the NSF signal.

The frame checking sequence 38 is used at the receiving end to check for transmission errors.

When the NSF data recognition module 21 receives a facsimile signal having the above frame structure, the NSF data recognition module 21 checks the facsimile control field 36 to determine whether the signal is an NSF signal or not. If the content of the facsimile control field 36 is '00000100', the NSF data recognition module 21 recognizes that the received facsimile signal as an NSF signal.

The NSF data abandonment module 22 discards any NSF signals detected by the NSF data recognition module 21, so that NSF signals received from facsimile terminal 1B do not pass through the network. This prevents the communication apparatuses 10A, 10B, which comply with ITU-T Recommendation T.38, from receiving proprietary communication sequences that they are not equipped to handle.

When the NSF data recognition module 21 recognizes an NSF signal, the replacement NSF signal transmission control module 23 generates a replacement NSF signal, and controls the sending of the replacement NSF signal to the communication apparatus accommodating the transmitting facsimile terminal.

The replacement NSF signal is an NSF signal identical to the NSF signal received from receiving facsimile terminal 1B, except that the data in the facsimile information field 37 are replaced with the replacement NSF data stored in the replacement NSF data memory 16B.

In the first embodiment, when consecutive NSF signals are received from facsimile terminal 1B, the replacement NSF signal transmission control module 23 performs this replacement on the first NSF signal.

Communication apparatus 10A receives the replacement facsimile signal with the modified NSF data following the preamble signal and accordingly does not time out, as it would do if it were to receive a preamble not followed by any facsimile signal.

The replacement NSF signal transmission control module 23 may send the replacement NSF signal as soon as the replacement NSF signal transmission control module 23 detects reception of the NSF signal from facsimile terminal 1B. Alternatively, the replacement NSF signal transmission control module 23 may wait to see if further NSF signals follow, and only send the replacement signal when the number of consecutive NSF signals, or the amount of signal data, reaches a predetermined limit, provided that this limit is low enough to ensure that facsimile terminal 1A receives the replacement NSF signal before the elapse of its time-out time Tb. In another variation, the replacement NSF signal is sent after a predetermined time (less than the time-out time Tb) has elapsed from detection of the first NSF signal from facsimile terminal 1B.

In yet another variation, the replacement of the NSF data is carried out not on the first NSF signal but on a later NSF signal in a series of consecutively received NSF signals, as appropriate in terms of transmission timing.

The other functional blocks of the communication apparatuses 10A, 10B will now be described with reference once again to FIG. 4.

The jitter absorption buffers 12A, 12B store voice packets that are received under the control of the digital signal processing units 11A, 11B.

The voice processing units 13A, 13B convert compressed voice data provided from the digital signal processing units 11A, 11B to packets and send the packets on voice signal path P1. The voice processing units 13A, 13B also assemble voice packets received from the voice signal path P1 into compressed voice data and supply the compressed voice data to the digital signal processing units 11A, 11B.

The facsimile communication processing units 14A, 14B control the facsimile communication sequence. During facsimile communication complying with ITU-T Recommendation T.38, the facsimile communication processing units 14A, 14B convert facsimile data supplied by the digital signal processing units 11A, 11B to IFP packets (facsimile data packets complying with ITU-T Recommendation T.38, also referred to as T.38 packets) and send them on the control signal path P2. The facsimile communication processing units 14A, 14B also assemble IFP packets received from the control signal path P2 into facsimile data and supply the facsimile data to the digital signal processing units 11A, 11B.

The call processing units 15A, 15B carry out call set-up processing according to ITU-T Recommendation T.38.

The replacement NSF data memories 16A, 16B store the replacement NSF data to be inserted into the facsimile information field 37 of NSF signals to generate replacement NSF signals when the NSF data recognition module 21 detects reception of NSF signals from an accommodated facsimile terminal.

The replacement NSF data may be any data that prevent the use of the proprietary communication sequence requested by the NSF signal. In the first embodiment, a vendor code that identifies the manufacturer of the T.38-compliant communication apparatuses 10A, 10B is used.

Next, the operation of the facsimile communication system according to the first embodiment will be described with reference to FIG. 7, which illustrates the initial part of a facsimile communication sequence.

Figure 7:
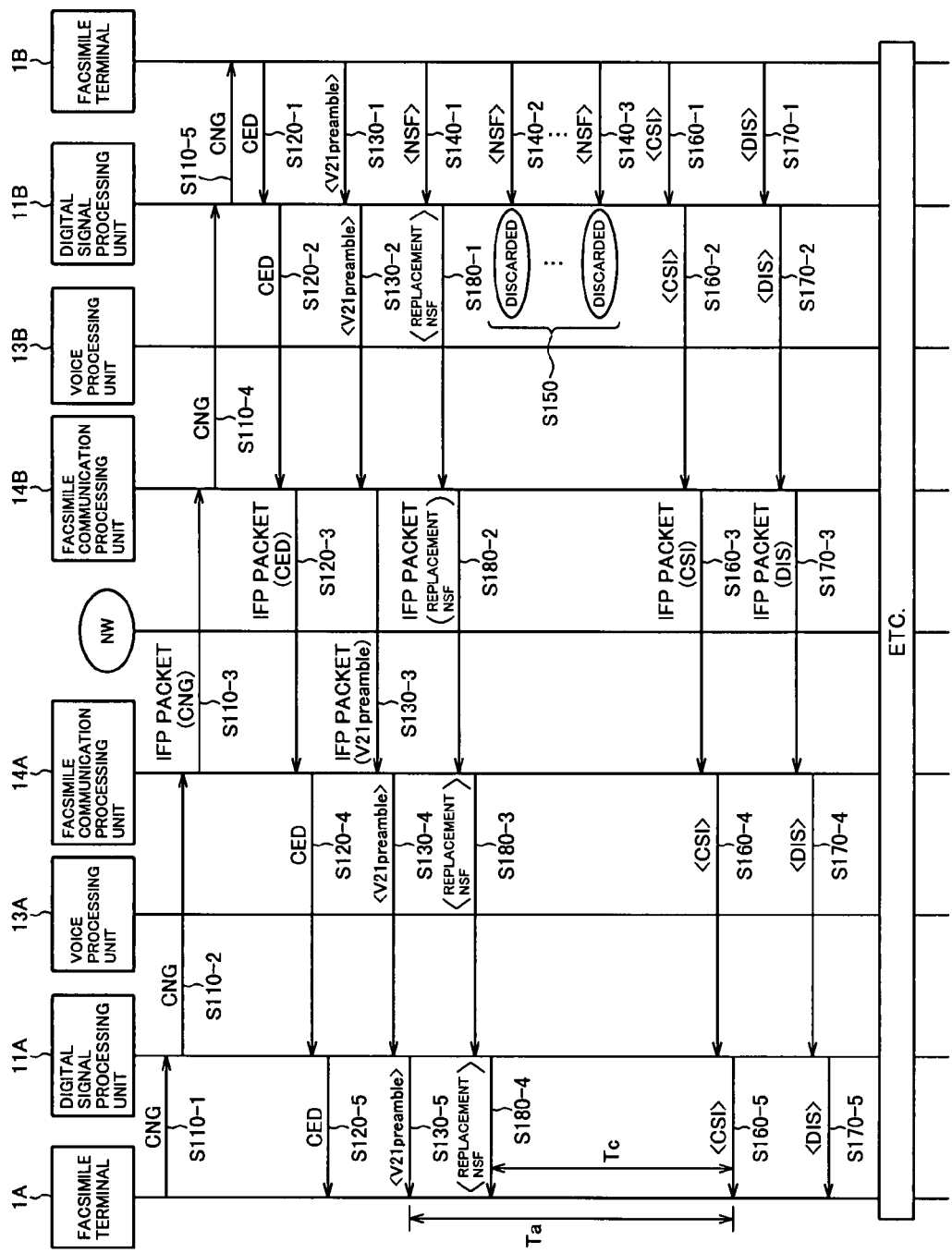
FIG. 7 illustrates an initial part of a facsimile communication sequence in the first embodiment.

In FIG. 7, facsimile terminal 1A sends a CNG (calling tone) signal to initiate a facsimile transmission to facsimile terminal 1B (S110-1).

The digital signal processing unit 11A in communication apparatus 10A detects the calling tone from facsimile terminal 1A and notifies the facsimile communication processing unit 14A (S110-2). The CNG signal is converted to an IFP packet by the facsimile communication processing unit 14A and sent over the network NW to communication apparatus 10B (S110-3). The facsimile communication processing unit 14B in communication apparatus 10B receives this IFP packet (CNG), converts it to a CNG signal, and notifies the digital signal processing unit 11B (S110-4). The digital signal processing unit 11B sends the CNG signal to facsimile terminal 1B (S110-5).

Facsimile terminal 1B replies to the CNG signal by sending a CED (called station identification tone) signal, identifying itself as a facsimile terminal (S120-1). The CED signal is received by communication apparatus 10B.

The digital signal processing unit 11B in communication apparatus 10B detects the CED signal and notifies the facsimile communication processing unit 14B (S120-2), which converts the CED signal to an IFP packet and sends the IFP packet over the network NW to communication apparatus 10A (S120-3). The facsimile communication processing unit 14A in communication apparatus 10A receives this IFP packet, converts it to a CED signal, and notifies the digital signal processing unit 11A (S120-4), which sends the CED signal to facsimile terminal 1A (S120-5).

Facsimile terminal 1B now sends a preamble signal to facsimile terminal 1A (S130-1 to S130-5). The preamble signal is used for adjustment of echo suppressors and other components on the communication line to ensure successful transmission of subsequent data. When a 300-bit/s modem is used, for example, the preamble is a flag sequence lasting one second ±15%. The preamble signal reaches facsimile terminal 1A through the same sequence of steps (S120-1 to S120-5) as followed by the CED signal; a detailed description will be omitted.

When facsimile terminal 1A detects the preamble signal, it starts a timer and waits to receive a facsimile signal from facsimile terminal 1B.

After sending the preamble signal, facsimile terminal 1B sends an NSF signal to invite facsimile terminal 1A to use a proprietary communication protocol. The NSF signal is lengthy, so it is received by communication apparatus 10B as a series of signals (S140-1, S140-2, . . . , S140-3).

When communication apparatus 10B receives the first NSF signal (S140-1) from facsimile terminal 1B, the digital signal processing unit 11B analyzes it, identifies it as an NSF signal, generates a replacement NSF signal by replacing the data in its facsimile information field 37 with the replacement NSF data stored in the replacement NSF data memory 16B, and sends the replacement NSF signal to the facsimile communication processing unit 14B (S180-1). The facsimile communication processing unit 14B converts the replacement NSF signal to an IFP packet and sends it over the network (NW) to communication apparatus 10A (S180-2). In communication apparatus 10A, facsimile communication processing unit 14A receives the IFP packet, converts it to an NSF signal, and sends the NSF signal to the digital signal processing unit 11A (S180-3), which sends the NSF signal to facsimile terminal 1A (S180-4).

Facsimile terminal 1A receives the NSF signal sent from the digital signal processing unit 11A, analyzes it, and finds the T.38-compliant vendor code inserted by communication apparatus 10B instead of the code sent by facsimile terminal 1B to invite the use of a proprietary communication sequence. Accordingly, even if both facsimile terminals 1A, 1B are products of the same manufacturer and both support the manufacturer's proprietary communication sequence, since facsimile terminal 1A does not receive the invitation sent by facsimile terminal 1B, it does not accept the invitation.

In addition, when facsimile terminal 1A receives the replacement NSF signal from digital signal processing unit 11A, it resets the time-out timer that it set upon receiving the preamble, so no time-out occurs.

In the meantime, the digital signal processing unit 11B in communication apparatus 10B discards (S150) the following NSF signals (S140-2, . . . , S140-3) without generating replacement NSF signals for them.

After completing its NSF signal transmission, facsimile terminal 1B sends a CSI (Called Subscriber Identification) signal if necessary (S160-1 to S160-5), and then sends a DIS signal (Digital Information Signal) designating all standard facilities (S170-1 to S170-5). The CSI and DIS signals are sent to facsimile terminal 1A by the same route as used for the CED signal (S120-1 to S120-5), so a detailed description is omitted.

In FIG. 7, duration Ta represents the time elapsed from reception of the preamble signal by the transmitting facsimile terminal 1A to reception of the next facsimile signal (e.g., CSI). The value of Ta is the sum of the preamble transmission time and the NSF signal transmission time.

$$Ta = \text{preamble signal transmission time} + NSF \text{ signal transmission time} \quad (1)$$

When facsimile communication passes through voice communication apparatus in network NW, it may be necessary for the jitter absorption buffer 12A to buffer data for a certain time in order to absorb network jitter, in which case the buffering time is added as well.

$$Ta = \text{preamble signal transmission time} + \quad (2)$$
$$NSF \text{ signal transmission time} +$$
$$\text{buffering time to absorb network jitter}$$

The duration Tc in FIG. 7 can be expressed as follows.

$$Tc = NSF \text{ signal transmission time} - \quad (3)$$
$$\text{transmission time of first } NSF \text{ signal}$$

Figure 3:
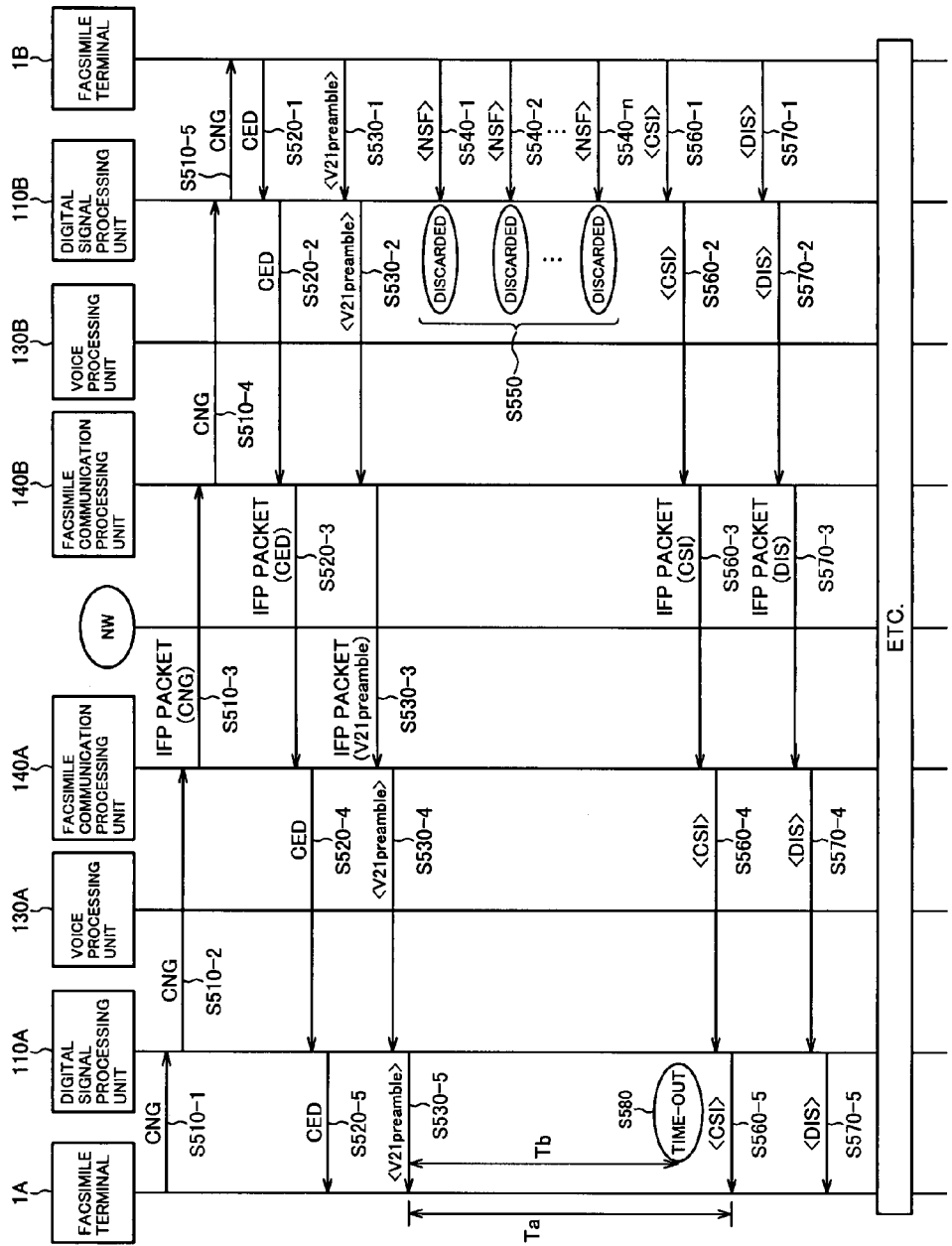
FIG. 3 illustrates an initial part of an unsuccessful conventional facsimile communication sequence.

This duration is shorter than duration Ta by the length of the preamble plus the length of the first part of the NSF signal transmission (S140-1). The difference remains the same if buffering time for absorbing network jitter is added to equation (3). Notwithstanding the length of the NSF transmission by facsimile terminal 1B, duration Tc is less than the time-out duration Tb shown in FIG. 3.

By replacing the NSF signal sent from the receiving facsimile terminal 1B with a replacement NSF signal that does not lead to the use of a proprietary communication protocol, the first embodiment enables the facsimile terminals 1A, 1B to communicate by the standard T.38 protocol that the communication apparatuses 10A, 10B support, and prevents the facsimile communication from failing due to a time-out, even if the receiving facsimile terminal 1B sends such a long NSF signal that the transmitting facsimile terminal 1A would time out if the NSF signal were simply to be blocked.

Second Embodiment

Next, a second embodiment of the invented communication apparatus and facsimile communication system will be described. Like the first embodiment, the second embodiment enables communication apparatus complying with ITU-T Recommendation T.38 to complete a facsimile transmission without a time-out at the transmitting facsimile terminal.

Figure 8:
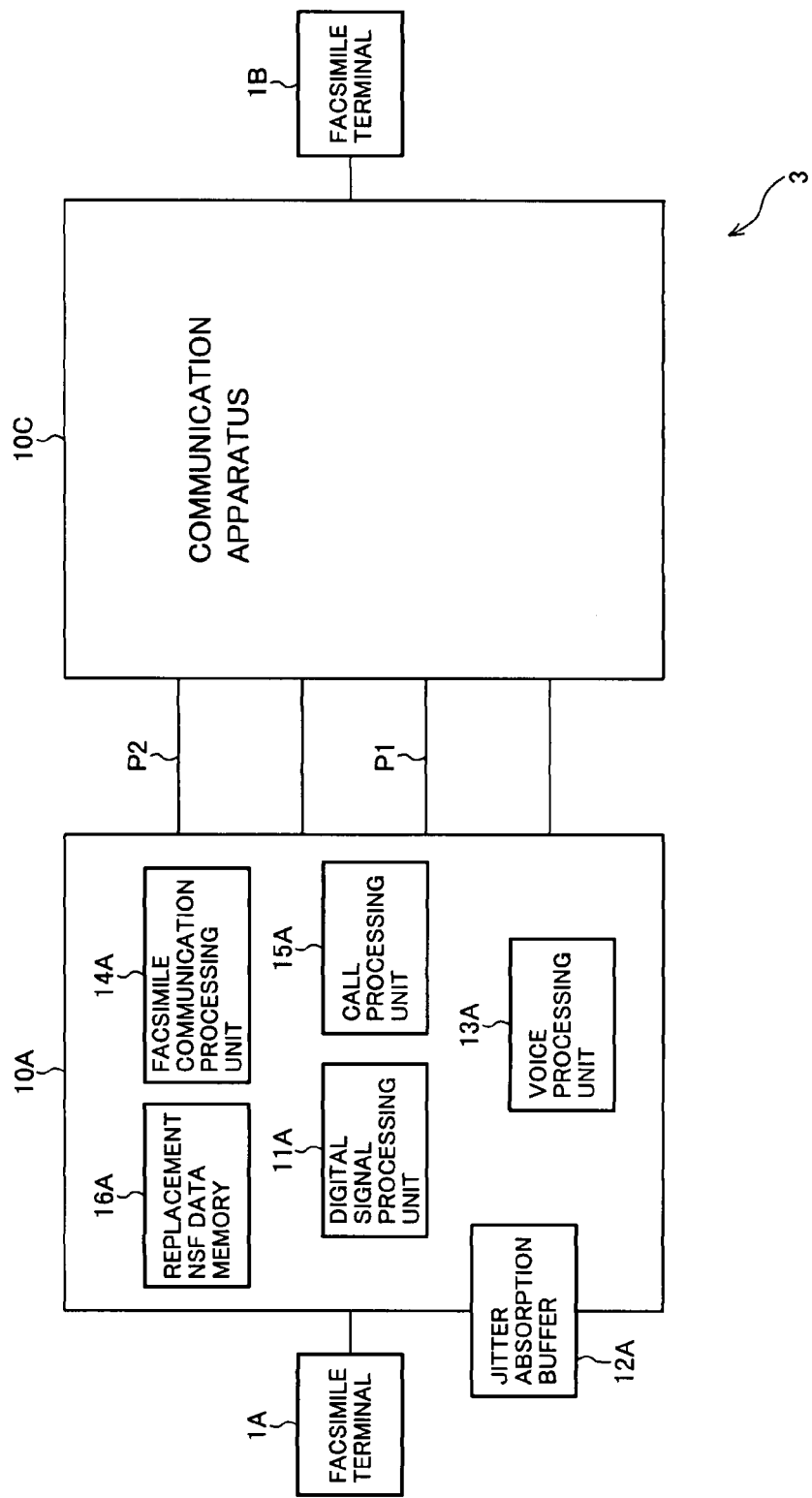
FIG. 8 is a block diagram illustrating a facsimile communication system according to a second embodiment.
Figure 9:
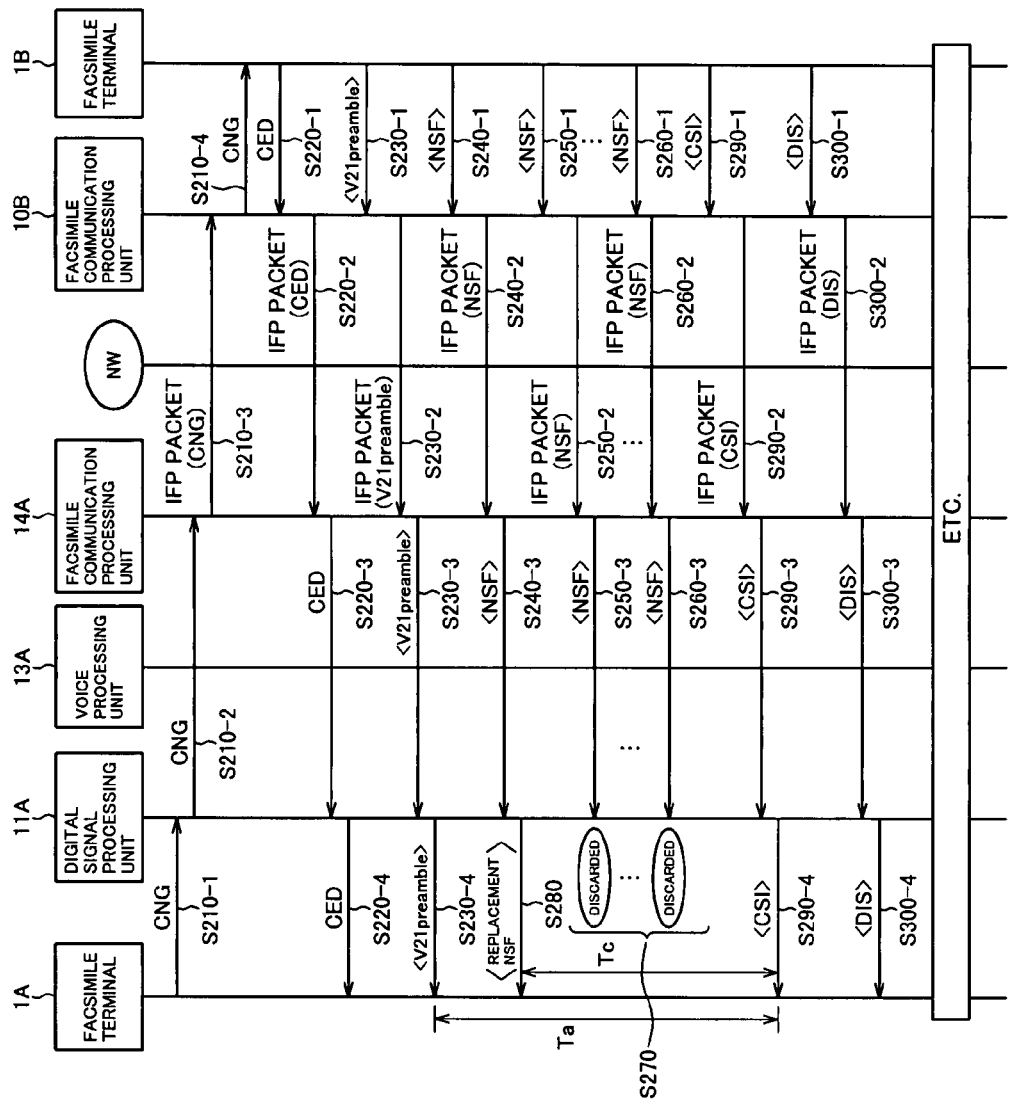
FIG. 9 illustrates an initial part of a facsimile communication sequence in the second embodiment.

Referring to FIG. 8, the facsimile communication system 3 in the second embodiment includes the same facsimile terminals 1A, 1B and communication apparatus 10A as in the first embodiment, but the communication apparatus 10C that accommodates facsimile terminal 1B lacks features for discarding and replacing NSF signals. Accordingly, if facsimile terminal 1B generates an NSF signal, communication apparatus 10C converts it to IFP packets and sends the packets to communication apparatus 10A.

In the second embodiment, accordingly, communication apparatus 10A receives NSF signals, not from the facsimile terminal 1A to which it is connected, but from the distant facsimile terminal 1B via the network NW.

If communication apparatus 10A were to pass these NSF signals on to facsimile terminal 1A, facsimile terminal 1A might then start using a facsimile protocol that communication apparatus 10A does not support. If communication apparatus 10A were simply to block the NSF signals, however, then facsimile terminal 1A might time out.

To prevent the time-out, in the second embodiment communication apparatus 10A performs the same type of replacement of NSF data as was performed by communication apparatus 10B in the first embodiment, except that the replacement is performed for an NSF signal received from the network NW.

The communication apparatus 10A has the same internal structure same as in the first embodiment, comprising a digital signal processing unit 11A, a jitter absorption buffer 12A, a voice processing unit 13A, a facsimile communication processing unit 14A, a call processing unit 15A and a replacement NSF data memory 16A.

Next, the operation of the communication system 3 in the second embodiment will be described with reference to FIG.

9, which illustrates the initial part of a facsimile transmission from facsimile terminal 1A to facsimile terminal 1B.

Facsimile terminal 1A initiates the transmission by sending a CNG signal to facsimile terminal 1B (S210-1 to S210-4). The CNG signal is detected by the digital signal processing unit 11A in communication apparatus 10A, converted to IFP packet form by the facsimile communication processing unit 14A, and sent as an IFP packet over the network NW. Communication apparatus 10C receives the IFP packet, converts it to a CNG tone, and sends the CNG tone to facsimile terminal 1B.

Facsimile terminal 1B replies to the CNG signal by sending a CED signal back to facsimile terminal 1A (S220-1 to S220-4). Communication apparatus 10C converts the CED signal to an IFP packet and sends the packet over the network NW. In communication apparatus 10A, the facsimile communication processing unit 14A receives the IFP packet and notifies the digital signal processing unit 11A, which sends a CED signal to the transmitting facsimile terminal 1A.

Facsimile terminal 1B now sends a preamble signal to facsimile terminal 1A (S230-1 to S230-4). The preamble signal is sent by the same series of steps as the CED signal (S220-1 to S220-4). When facsimile terminal 1A detects reception of the preamble signal from facsimile terminal 1B, facsimile terminal 1A starts a timer.

After sending the preamble signal, facsimile terminal 1B sends an NSF signal, which communication apparatus 10C receives as a series of NSF signals (S240-1, S250-1, . . . , S260-1). Communication apparatus 10C transmits all of these NSF signals as IFP packets over the network NW to communication apparatus 10A (S240-2, S250-2, . . . , S260-2).

In communication apparatus 10A, the facsimile communication processing unit 14A receives these IFP packets, converts them to the successive parts of the original NSF signal, and sends the resulting NSF signals to the digital signal processing unit 11A (S240-3, S250-3, . . . , S260-3).

The digital signal processing unit 11A analyzes the first of these facsimile signals, recognizes it is an NSF signal, replaces the contents of its facsimile information field 37 with NSF data stored in the replacement NSF data memory 16A as explained in the first embodiment to generate a replacement NSF signal indicating non-use of a proprietary communication protocol, and sends the replacement NSF signal to facsimile terminal 1A (S280).

Upon receiving the replacement NSF signal from the digital signal processing unit 11A, facsimile terminal 1A analyzes it and finds a T.38-compliant vendor code instead of a code inviting the use of a proprietary communication protocol not supported by communication apparatus 10A. At this time facsimile terminal 1A also resets the timer it set when it began receiving the preamble.

In communication apparatus 10A, the digital signal processing unit 11A continues to analyze the succeeding NSF signals as they are supplied from the facsimile communication processing unit 14A, but instead of generating replacement NSF signals, it simply discards them (S270).

After completing the NSF transmission, the receiving facsimile terminal 1B sends the transmitting facsimile terminal 1A a CSI signal if necessary (S290-1 to S290-4) and a DIS signal designating all standard facilities (S300-1 to S300-4). The CSI and DIS signals are transmitted in the same way as the CED signal (S220-1 to S220-4), so a detailed description is omitted.

Facsimile terminal 1A receives the CSI (or DIS) signal before timing out, so it proceeds with the facsimile transmission according to the T.38 protocol. As in the first embodiment, even if both facsimile terminals 1A, 1B are manufactured by the same manufacturer and support that manufacturer's proprietary communication protocol, since communication apparatus 10A replaces the NSF signal transmitted by facsimile terminal 1B with an NSF signal that does not invite the use of non-standard facilities, the manufacturer's proprietary communication protocol is not used.

The durations Ta and Tc in FIG. 7 from reception of the preamble and the replacement NSF signal to reception of the CSI signal have the same values as in the first embodiment and can be calculated by the same equations (1) to (3). The duration Tc from reception of the replacement NSF signal to reception of the CSI signal is again shorter than the time-out time Tb in FIG. 3.

The second embodiment accordingly has the same effect as the first embodiment, enabling communication apparatus that supports only ITU-T Recommendation T.38 to carry facsimile transmissions between facsimile terminals without allowing a time-out to occur, even if the receiving facsimile terminal supports a proprietary protocol and transmits a long NSF signal.

The second embodiment also permits the variations noted in the first embodiment. That is, the digital signal processing unit 11A may defer transmission of the replacement NSF signal to facsimile terminal 1A for a certain time (less than the time-out time), or until a predetermined number of consecutive NSF signals have been received from the facsimile communication processing unit 14A, or until a predetermined amount of NSF data has been received.

The invention is not limited to the configuration shown in the embodiments above in which the facsimile terminals are interfaced directly to the network through the communication apparatuses. For example, there may be a PBX interposed between the communication apparatus and the network, or between the communication apparatus and the facsimile terminal, at either end or both ends.

While it is desirable for a communication apparatus to have the capabilities shown in both the first and second embodiments, that is, to be able to replace NSF signals sent either toward the network or toward the accommodated facsimile terminal, the invention can also be practiced by providing only the capability shown in the first embodiment, or only the capability shown in the second embodiment.

The capabilities of the communication apparatuses 10A, 10B described in the first and second embodiments may be implemented as software that is stored, read, and executed by a computing device. Some or all of the capabilities may also be implemented as specialized hardware.

Those skilled in the art will recognize that further variations are possible within the scope of the invention, which is defined in the appended claims.

What is claimed is:

1. A communication apparatus connectable to a facsimile terminal and a network, comprising:
   a facsimile communication processing unit for mediating facsimile transmission compliant with a predetermined protocol by converting first facsimile signals received from the facsimile terminal to first facsimile packets, sending the first facsimile packets on the network, converting second facsimile packets received from the network to second facsimile signals, and sending the second facsimile signals to the facsimile terminal;
   a non-standard facility (NSF) data recognition module for analyzing the first facsimile signals and/or the second facsimile signals and designating as non-transmittable any analyzed facsimile signals that include data identifying a non-standard facility left unspecified by the predetermined protocol and invite use of the non-standard facility;

an NSF data abandonment module for blocking the facsimile signals designated as non-transmittable by the NSF data recognition module;

a replacement NSF data memory storing replacement data nullifying use of the non-standard facility; and a replacement NSF signal transmission control module for replacing the data identifying the non-standard facility with the replacement data, so that a facsimile signal designated as non-transmittable by the NSF data recognition module is converted to a modified facsimile signal for transmission to the facsimile terminal or the network.

2. The communication apparatus of claim 1, wherein the predetermined protocol is an internet facsimile protocol.

3. The communication apparatus of claim 1, wherein the first facsimile signals conform to a binary signaling system.

4. The communication apparatus of claim 1, wherein
the NSF data recognition module analyzes the first facsimile signals, and
the replacement NSF signal transmission control module sends the modified facsimile signal to the facsimile communication processing unit to be converted to a packet and sent on the network.

5. The communication apparatus of claim 1, wherein
the NSF data recognition module analyzes the second facsimile signals, and
the replacement NSF signal transmission control module sends the modified facsimile signal to the facsimile terminal.

6. The communication apparatus of claim 1, wherein
the NSF data recognition module analyzes both the first facsimile signals and the second facsimile signals,
the replacement NSF signal transmission control module sends the modified facsimile signal to the facsimile communication processing unit to be converted to a packet and sent on the network if the modified facsimile signal replaces a signal of the first facsimile signals, and
the replacement NSF signal transmission control module sends the modified facsimile signal to the facsimile terminal if the modified facsimile signal replaces a signal of the second facsimile signals.

7. The communication apparatus of claim 1 wherein,
if the NSF data recognition module designates a consecutive series of facsimile signals as non-transmittable, the NSF data abandonment module blocks all of the consecutive series of facsimile signals designated as non-transmittable, and the replacement NSF signal transmission control module generates the modified facsimile signal from an initial facsimile signal in the consecutive series.

8. The communication apparatus of claim 1 wherein, if the NSF data recognition module designates a consecutive series of facsimile signals as non-transmittable, the replacement NSF signal transmission control module sends the modified facsimile signal in place of an initial facsimile signal in the consecutive series.

9. The communication apparatus of claim 1 wherein, if the NSF data recognition module designates a consecutive series of facsimile signals as non-transmittable, the replacement NSF signal transmission control module sends the modified facsimile signal after a predetermined number of facsimile signals in the consecutive series have been designated as non-transmittable.

10. The communication apparatus of claim 1 wherein, if the NSF data recognition module designates a consecutive series of facsimile signals as non-transmittable, the replacement NSF signal transmission control module sends the modified facsimile signal after a predetermined amount of data included in the facsimile signals in the consecutive series have been analyzed.

11. The communication apparatus of claim 1 wherein, if the NSF data recognition module designates a consecutive series of facsimile signals as non-transmittable, the replacement NSF signal transmission control module sends the modified facsimile signal after a predetermined time has elapsed from analysis of an initial facsimile signal in the consecutive series, provided the consecutive series continues for at least the predetermined time.

12. The communication apparatus of claim 1, wherein
the first facsimile signals and the second facsimile signals include a preamble signal,
the facsimile signals designated as non-transmittable by the NSF data recognition module follow the preamble signal, and
the replacement NSF signal transmission control module outputs the modified facsimile signal within a predetermined time such that the facsimile transmission is not terminated due to a time-out at the facsimile terminal or a time-out at a distant facsimile terminal to which the modified facsimile signal is addressed.

13. The communication apparatus of claim 1, wherein the replacement data include a vendor code identifying a manufacturer of the communication apparatus.

14. The communication apparatus of claim 1, wherein the replacement data include a vendor code identifying a manufacturer of the equipment complying with the predetermined protocol.

15. A facsimile transmission system including the communication apparatus, network, and facsimile terminal of claim 1, at least one other communication apparatus with which the communication apparatus of claim 1 communications over the network, and at least one other facsimile terminal connected to the other communication apparatus.

16. A communication apparatus connectable to a facsimile terminal and a network, comprising:
a facsimile communication processing unit for mediating facsimile transmission compliant with a predetermined protocol by converting facsimile packets received from the network to facsimile signals, and sending the converted facsimile signals to the facsimile terminal;
a non-standard facility (NSF) data recognition module for analyzing the facsimile signals received from the network and designating as non-transmittable any analyzed facsimile signals that include data identifying a non-standard facility left unspecified by the predetermined protocol and invite use of the non-standard facility;
an NSF data abandonment module for blocking the facsimile signals designated as non-transmittable by the NSF data recognition module;
a replacement NSF data memory storing replacement data nullifying use of the non-standard facility; and
a replacement NSF signal transmission control module for replacing the data identifying the non-standard facility with the replacement data, so that a facsimile signal designated as non-transmittable by the NSF data recognition module is converted to a modified facsimile signal for transmission to the facsimile terminal.

* * * * *